US009253611B2

(12) United States Patent
Tseng et al.

(10) Patent No.: US 9,253,611 B2
(45) Date of Patent: Feb. 2, 2016

(54) METHOD OF HANDLING A SHORT MESSAGE SERVICE RE-DELIVERY

(71) Applicant: HTC Corporation, Taoyuan County (TW)

(72) Inventors: Fan-Min Tseng, Taoyuan County (TW); Ching-Yu Liao, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 36 days.

(21) Appl. No.: 14/133,565

(22) Filed: Dec. 18, 2013

(65) Prior Publication Data

US 2014/0171134 A1     Jun. 19, 2014

Related U.S. Application Data

(60) Provisional application No. 61/738,404, filed on Dec. 18, 2012.

(51) Int. Cl.
*H04W 4/14*     (2009.01)
*H04W 4/00*     (2009.01)

(52) U.S. Cl.
CPC ........................... *H04W 4/14* (2013.01)

(58) Field of Classification Search
CPC ....... H04W 4/14; H04W 4/12; H04W 88/184; H04L 12/5895; H04M 1/172552
USPC ......................................................... 455/466
See application file for complete search history.

(56) References Cited

U.S. PATENT DOCUMENTS

| 2010/0222089 | A1* | 9/2010 | Russell et al. ................. 455/466 |
| 2010/0298014 | A1* | 11/2010 | Kamphuis ............... H04W 4/14 |
| | | | 455/466 |
| 2012/0151488 | A1* | 6/2012 | Arcese et al. ................. 718/101 |
| 2012/0176964 | A1* | 7/2012 | Cai et al. ....................... 370/328 |
| 2013/0310088 | A1* | 11/2013 | Wong et al. ................... 455/466 |
| 2014/0112257 | A1* | 4/2014 | Yi ................................. 370/328 |
| 2014/0155112 | A1* | 6/2014 | Molnar et al. ................. 455/466 |

OTHER PUBLICATIONS

3GPP TS 23.040 V11.3.0, Sep. 2012.
3GPP TS 29.311 V11.0.0, Sep. 2012.
S2-124137, 3GPP SA WG2 meeting #93, T4 trigger via IMS, Oct. 8, 2012.
S2-124615, 3GPP SA WG2 meeting #94, SMS for IMS UE to IMS UE without MSISDN, Nov. 12, 2012.
European patent application No. 13020135.3, European Search Report mailing date: Mar. 21, 2014.
Nokia Siemens Networks, Nokia, "UE to UE delivery in IMS without MSISDN", SA WG2 Meeting #90, S2-121613, Apr. 16-20, 2012, Bratislava , Slovakia (revision of S2-121609 was 1506), XP050632182, p. 1-4.

(Continued)

*Primary Examiner* — Allahyar Kasraian
*Assistant Examiner* — B. M. M Hannan
(74) *Attorney, Agent, or Firm* — Winston Hsu; Scott Margo

(57) ABSTRACT

A method of handling a short message re-delivery for a network entity of a wireless communication system includes receiving a request corresponding to a transmission failure of a short message transmitted to a communication device without a Mobile Subscriber Integrated Services Digital Network Number (MSISDN); generating a first correlation identification (ID) according to the request; and storing the first correlation ID with a short message service center (SMSC) address corresponding to the short message.

8 Claims, 6 Drawing Sheets

(56) References Cited

OTHER PUBLICATIONS

Nokia Siemens Networks, LG Electronics, "Server to MSISDN-less IMS UE direction in IMS", SA WG2 Meeting #90, S2-121774, Apr. 16-20, 2012, Bratislava, Slovakia (revision of S2-121499), XP050682896, p. 1-10.

3GPP TR 23.863 V1.1.0 (Feb. 2012), "3rd Generation Partnership Project; Technical Specification Group Services and System Aspects; Support of Short Message Service (SMS) in IMS without MSISDN; Stage 2 (Release 11)", XP050555255, p. 1-59.

* cited by examiner

US 9,253,611 B2

METHOD OF HANDLING A SHORT MESSAGE SERVICE RE-DELIVERY

CROSS REFERENCE TO RELATED APPLICATIONS

This application claims the benefit of U.S. Provisional Application No. 61/738,404, filed on Dec. 18, 2012 and entitled "Function of Re-delivery SMS without MSISDN", the contents of which are incorporated herein in their entirety.

BACKGROUND OF THE INVENTION

1. Field of the Invention

The present invention relates to a method for a network of a wireless communication system, and more particularly, to a method of handling short message service (SMS) re-delivery for a network of a wireless communication system.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

The Mobile Subscriber Integrated Services Digital Network Number (MSISDN) together with International mobile Subscriber Identity (IMSI) are two important numbers used for identifying a mobile subscriber. The IMSI identifies the subscriber identity module (SIM) card, and the MSISDN is used for routing calls to the user. Simply put, the MSISDN is the telephone number to the SIM card in a mobile phone. Nowadays, the number of the mobile devices significantly increases and the MSISDN may run out due to the limited digits of the MSISDN. In other words, part of the communication devices may not have the corresponded MSISDN in the near feature. Thus, how to operate the wireless communication system having the communication devices without the MSISDN becomes an important topic to be discussed.

If a short message(SM) is failed to deliver due to temporary error, e.g., the UE is un-reachable or out of memory, the short message is stored in the short message service center (SMSC) for redelivery. The HSS/HLR sets the message waiting data (MWD) which is part of message waiting indication (MWI) to associate the UE and the SMSC storing the failed SM. The MWD contains the MSISDN or IMSI of the UE and a list of SMSC address.

SUMMARY OF THE INVENTION

In order to solve the above problem, the present invention provides a method of handling a short message service re-delivery for a network of a wireless communication system.

The present invention discloses a method of handling a short message re-delivery for a network entity of a wireless communication system comprising receiving a request corresponding to a transmission failure of a short message transmitted to a communication device without a Mobile Subscriber Integrated Services Digital Network Number (MSISDN); generating a first correlation identification (ID) according to the request; and storing the first correlation ID with a short message service center (SMSC) address corresponding to the short message.

The present invention further discloses a communication device for a wireless communication system, comprising a processing means; and a storage unit, coupled to the processing means, for storing a program code, wherein the program code instructs the processing means to execute the following step: receiving a request corresponding to a transmission failure of a short message transmitted to a communication device without a Mobile Subscriber Integrated Services Digital Network Number (MSISDN); generating a first correlation identification (ID) according to the request; and storing the first correlation ID with a short message service center (SMSC) address corresponding to the short message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
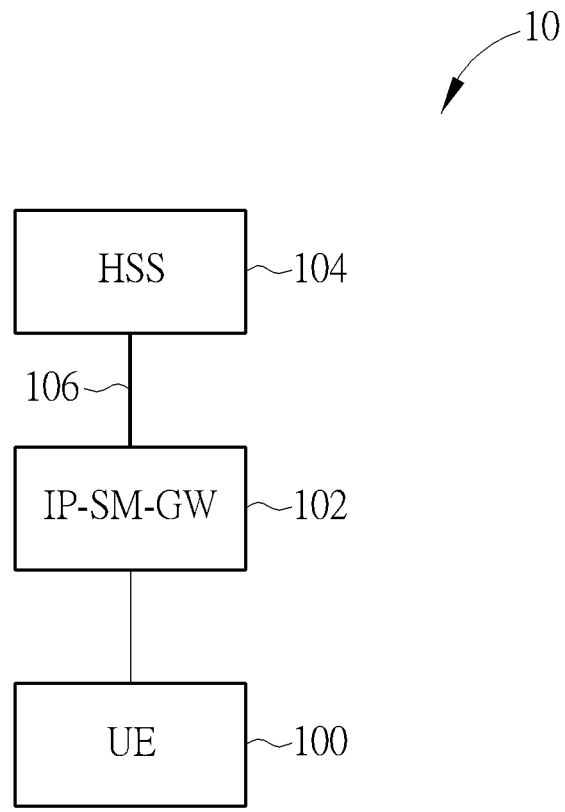
FIG. 1 is a schematic diagram of a wireless communication system according to an example of the present invention.

Please refer to FIG. 1, which is a schematic diagram of a wireless communication system 10 according to an example of the present invention. The wireless communication system 10 may be an LTE-A system, briefly composed of a user equipment (UE) 100, an Internet Protocol-Short-Message-Gateway (IP-SM-GW) 102, a home subscriber server (HSS) 104, an interface 106, an SMSC (Short Message Service Center, not shown) , and an IMS network (not shown) . In detail, the UE 100 may be a mobile station, a mobile phone, a laptop, a tablet computer, an electronic book or a portable computer system. The IP-SM-GW 102 provides protocol interworking for delivery of the short message between an IP-based UE without MSISDN and the SMSC. A short message is forwarded by the IP-SM-GW 102 from a UE (as an originating UE) to the SMSC via the IMS network, for delivery to another UE (as a terminating UE).

Figure 2:
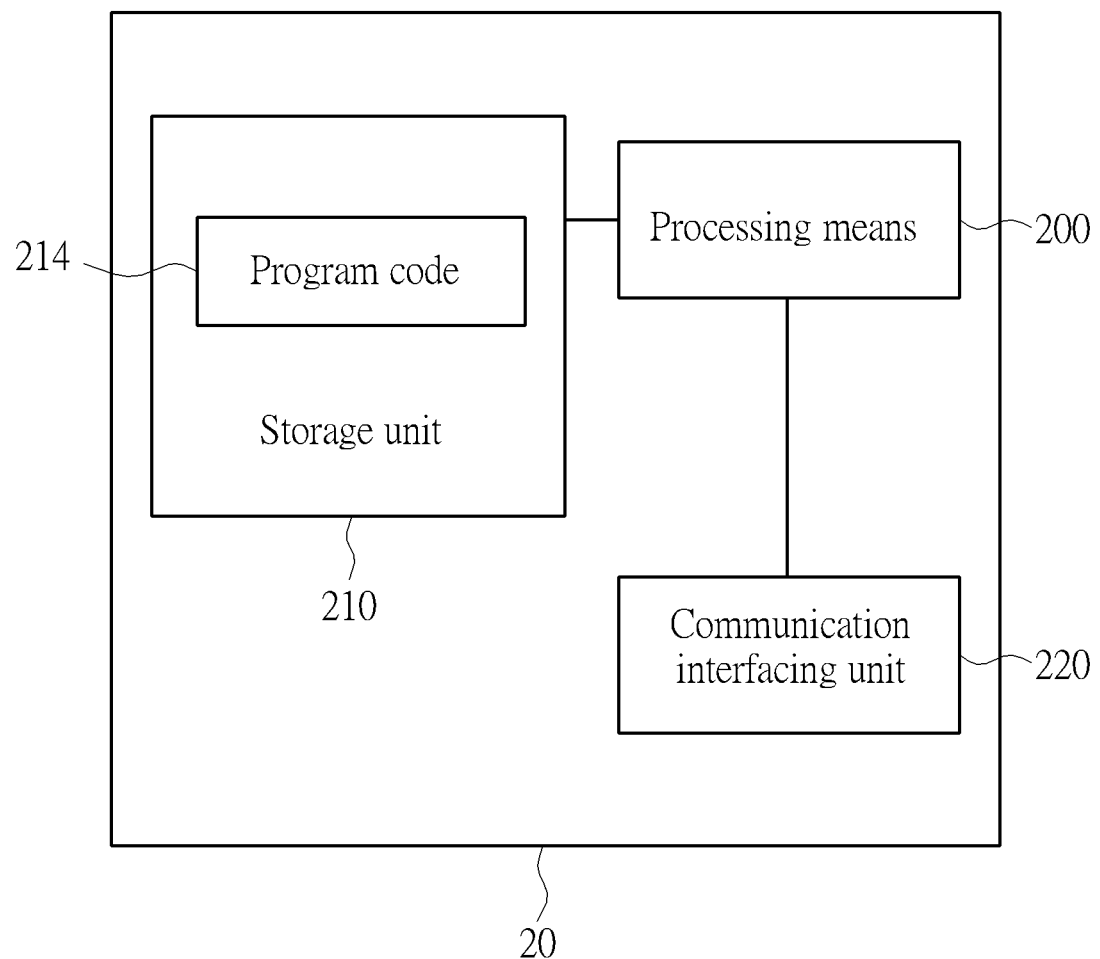
FIG. 2 is a schematic diagram of a communication device according to an example of the present invention.

Please refer to FIG. 2, which is a schematic diagram of a communication device 20 according to an example of the present invention. The communication device 20 may be the HSS 104 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
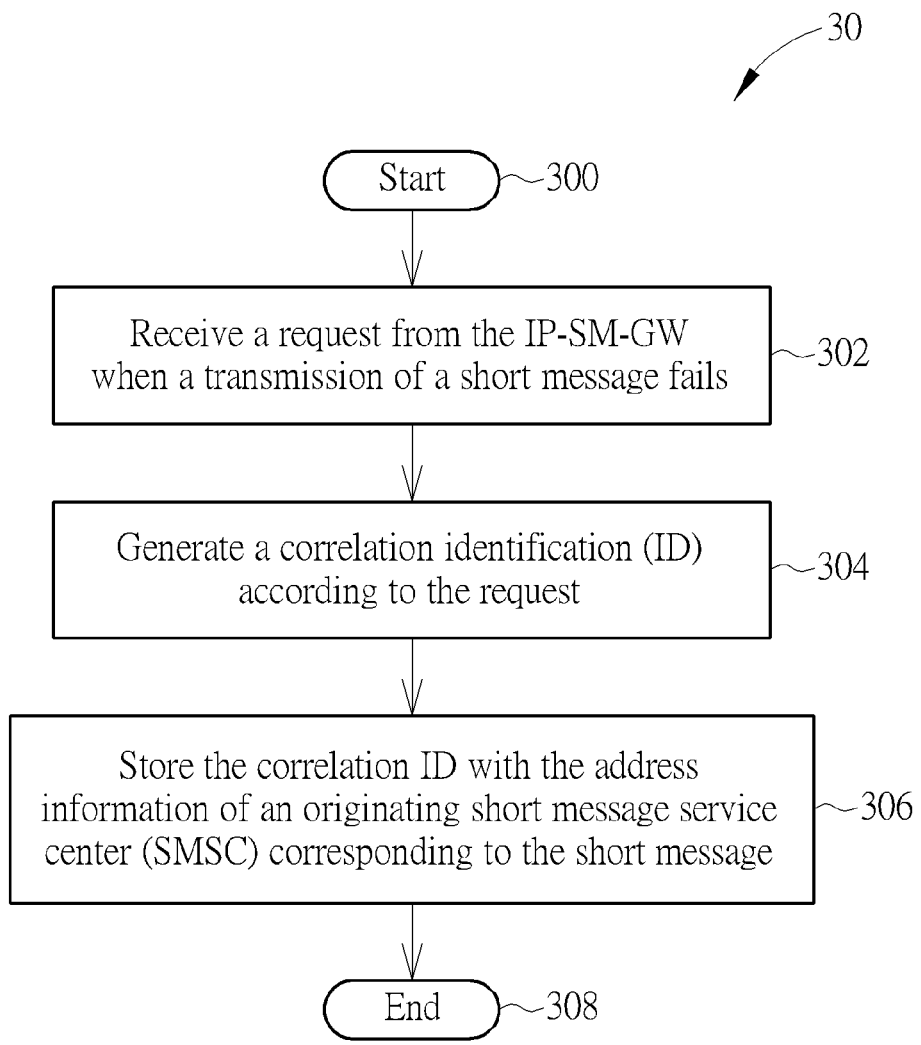
FIG. 3 is a flowchart of a process according to an example of the present invention.

Please refer to FIG. 3, which is a flowchart of a process 30 according to an example of the present invention. The process 30 can be utilized in the network entity of the wireless communication system 10, e.g. the HSS 104 shown in FIG. 1, for handling a short message re-delivery which is requested by IP-SM-GW 102. The process 30 may be compiled into the program code 214 and includes the following steps:

Step 300: Start.

Step 302: Receive a request from the IP-SM-GW when a transmission of a short message fails.

Step 304: Generate a correlation identification (ID) according to the request.

Step 306: Store the correlation ID with the address information of an originating short message service center (SMSC) corresponding to the short message.

Step 308: End.

According to the process 30, when an IMS network tries to transmit a short message to a UE without MSISDN via an IP-SM-GW and the IP-SM-GW fails to deliver the short message, the IP-SM-GW transmits a request to the HSS for querying a correlation ID for the failed delivered short message. The HSS generates the correlation ID according to the request and sends the correlation ID to the IP-SM-GW. Also, the HSS stores the correlation ID with an SMSC address corresponding to the short message. Under such a condition, when the HSS is notified that the UE is available to receive the short message, the HSS transmits an alert message containing the correlation ID to the SMSC storing the undelivered short message according to the SMSC address stored with the correlation ID. The SMSC therefore can deliver the short message to the UE identified by the correlation ID. As a result, the re-delivery of the short message to the UE without MSISDN can be completed.

Figure 4:
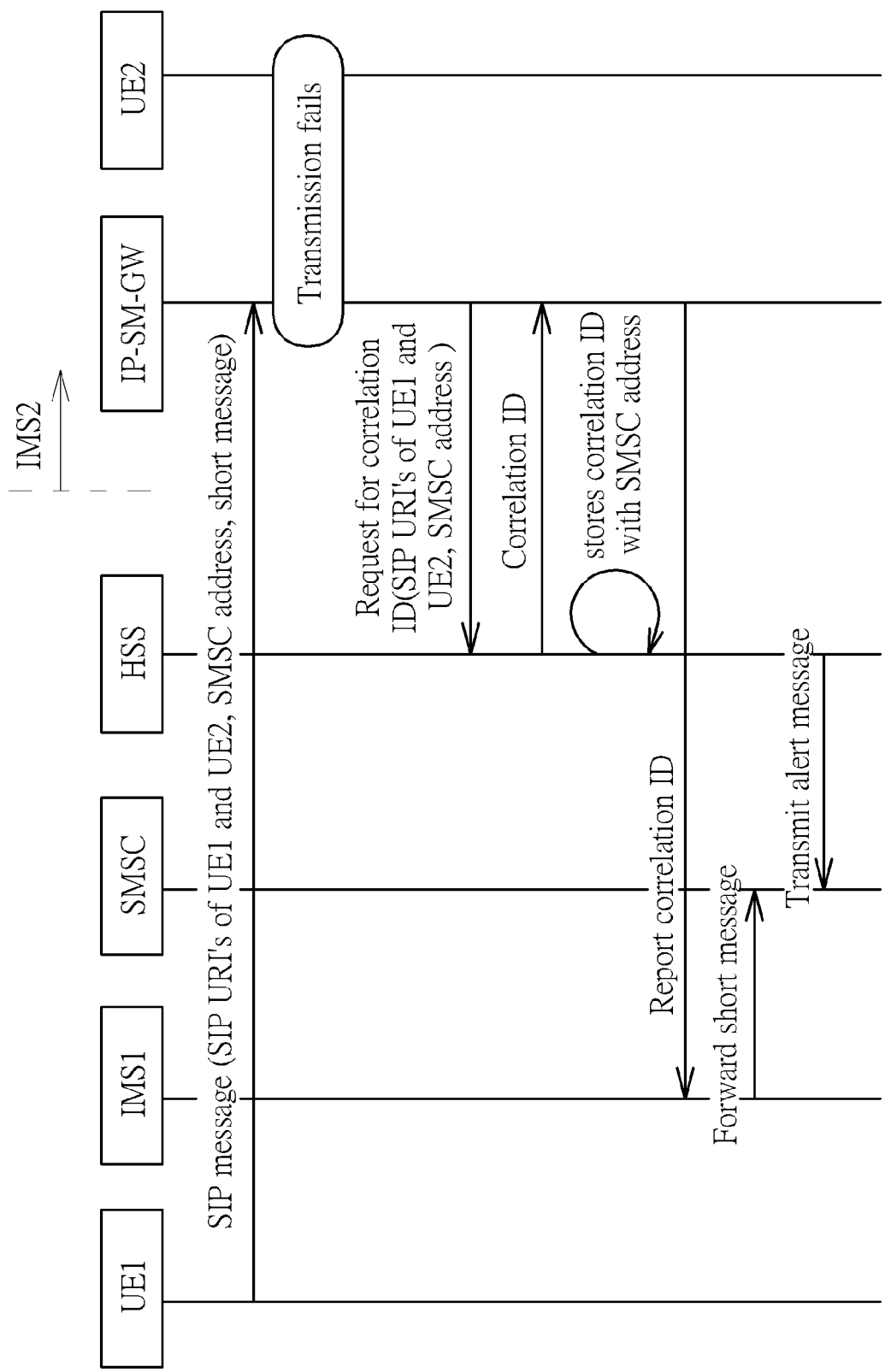
FIG. 4 is a schematic diagram of handling a short message re-delivery according to an example of the present disclosure.

As to details of the process 30, please refer to FIG. 4, which is a schematic diagram of handling a short message re-delivery according to an example of the present disclosure. When a UE UE1 tries to deliver a short message to a UE UE2 without the MSISDN, the IMS network IMS1 of the UE UE1 first sends a session initiation protocol (SIP) message to the IP-SM-GW responsible for the UE UE2, wherein the SIP message may comprise SIP uniform resource identifiers (URIs) of the UEs UE1 and UE2, a short message service center (SMSC) address and the short message. When the IP-SM-GW of the UE UE2 fails to transmit the short message due to non-permanent errors, such as temporarily absent of the UE UE2 and exceeded memory capacity of the UE UE2, the IP-SM-GW sends a request to the HSS for querying a correlation ID, wherein the request comprises the SIP URIs of the UE UE1 and UE2 and the SMSC address.

After receiving the request for the correlation ID from the IP-SM-GW, the HSS generates the correlation ID according to the request and transmits the correlation ID to the IP-SM-GW. In an example, the HSS generates the correlation ID according to the SMSC address. In another example, the HSS generates the correlation ID randomly. Next, the HSS stores the correlation ID with the SMSC address. In an example, the HSS stores the correlation ID with the SMSC address in message waiting data (MWD). After receiving the correlation ID, the IP-SM-GW of the UE UE2 reports the correlation ID to the IP-SM-GW in the IMS network IMS1, and the IP-SM-GW in the IMS network IMS1 then forwards the short message together with the correlation ID received from IP-SM-GW in the IMS network IMS2 (i.e. the IP-SM-GW of the UE UE2) to the SMSC. Under such a condition, when the HSS is notified that the UE UE2 is available (e.g. the UE UE2 becomes reachable or the memory of the UE UE2 is sufficient to receive the short message), the HSS transmits an alert message to the SMSC storing the undelivered short message based on the SMSC address stored with the correlation ID in the message waiting data. As a result, the re-delivery of the short message to the UE without MSISDN can be completed.

Figure 5:
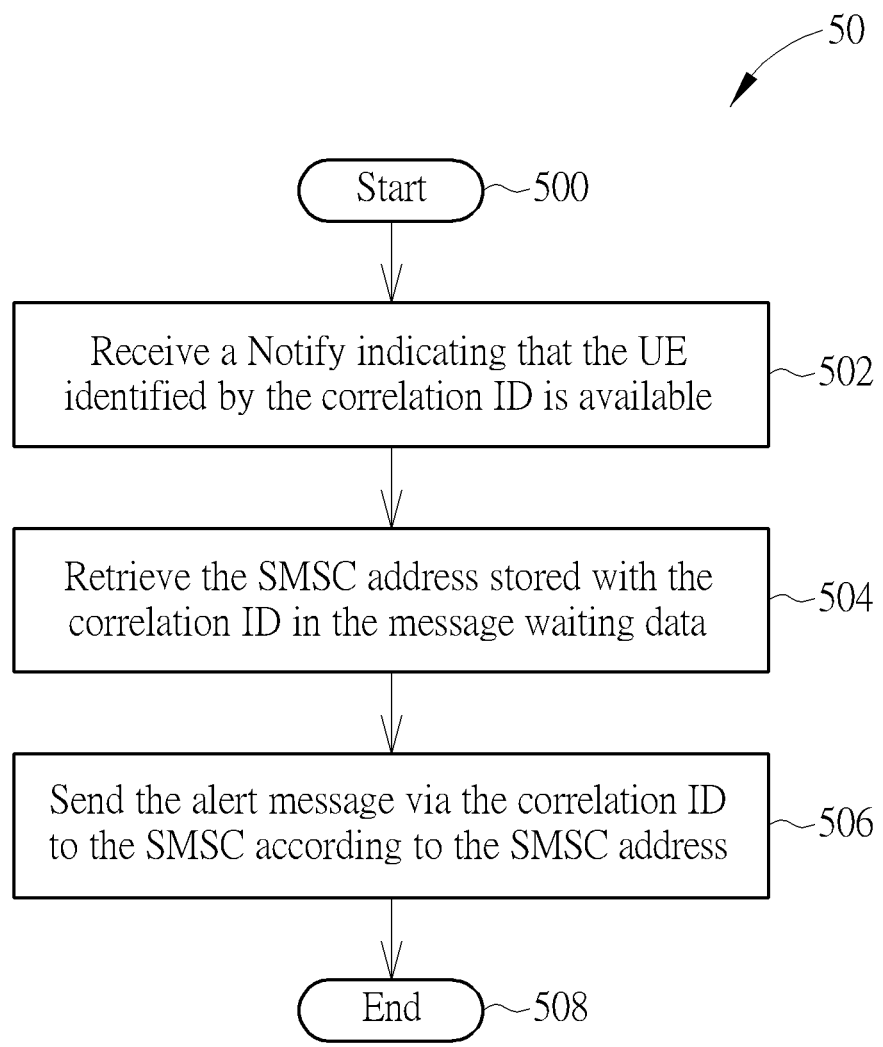
FIG. 5 is a flowchart of another process according to an example of the present invention.

The detailed operations of the HSS transmits the alert message when the HSS is notified that the UE identified by the correlation ID is available can be summarized into a process 50, as shown in FIG. 5. The process 50 can be utilized in the network entity of the wireless communication system 10, e.g. the HSS 104 shown in FIG. 1, for handling a short message re-delivery. The process 50 may be compiled into the program code 214 and includes the following steps:

Step 500: Start.

Step 502: Receive a Notify indicating that the UE identified by the correlation ID is available.

Step 504: Retrieve the SMSC address stored with the correlation ID in the message waiting data.

Step 506: Send the alert message via the correlation ID to the SMSC according to the SMSC address.

Step 508: End.

According to the process 50, when the HSS is notified that the UE identified by the correlation ID is available (e.g. the UE becomes reachable or the memory of the UE is sufficient to receive the short message), the HSS retrieves the SMSC address stored with the correlation ID in the message data and sends the alert message to the SMSC according to the SMSC address. As a result, the SMSC delivers the short message again and the re-delivery of the short message to the UE without MSISDN can be completed.

Figure 6:
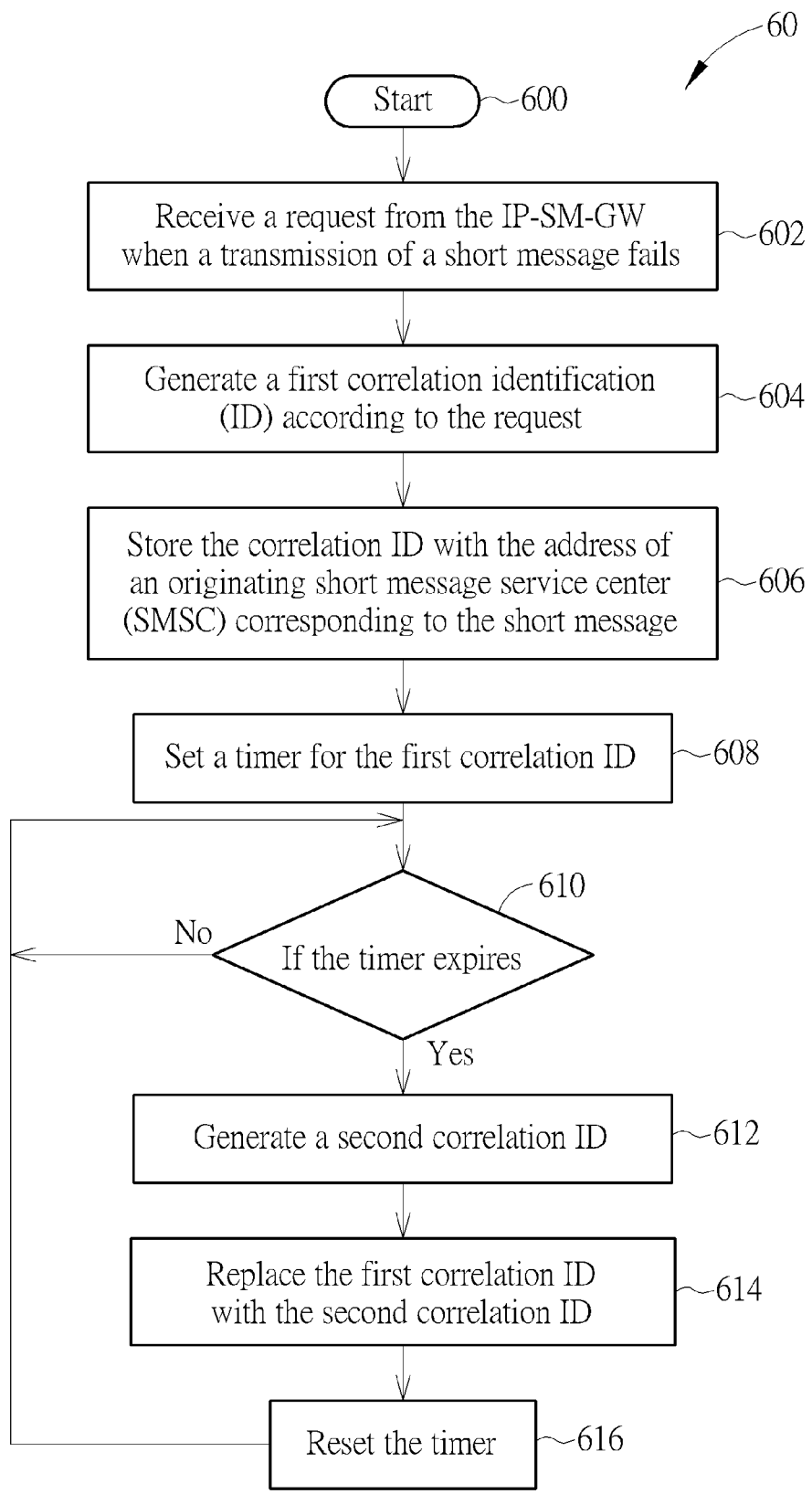
FIG. 6 is a flowchart of still another process according to an example of the present invention.

Please refer to FIG. 6, which is a flowchart of a process 60 according to an example of the present invention. The process 60 can be utilized in the network entity of the wireless communication system 10, e.g. the HSS 104 shown in FIG. 1, for handling a short message re-delivery. The process 60 may be compiled into the program code 214 and includes the following steps:

Step 600: Start.

Step 602: Receive a request from the IP-SM-GW when a transmission of a short message fails.

Step 604: Generate a first correlation identification (ID) according to the request.

Step 606: Store the correlation ID with the address of an originating short message service center (SMSC) corresponding to the short message.

Step 608: Set a timer for the first correlation ID.

Step 610: If the timer expires, perform step 612.

Step 612: Generate a second correlation ID.

Step 614: Replace the first correlation ID with the second correlation ID.

Step 616: Reset the timer.

According to the process 60, when the IMS network tries to transmit a short message to a UE without MSISDN via an IP-SM-GW and the IP-SM-GW fails to deliver the short message, the IP-SM-GW transmits a request to the HSS for querying a correlation ID for the failed delivered short message. According to the request, the HSS generates a first correlation ID and transmits the first correlation ID to the IP-SM-GW. The HSS also stores the correlation ID with an originating short message service center (SMSC) address corresponding to the short message. When generating the first correlation ID, the HSS simultaneously sets and starts a correlation ID timer for the first correlation ID and consistently determines whether the correlation ID timer expires. If the correlation ID timer expires (i.e. the lifetime of the first correlation ID ends), the HSS generates a second correlation ID to replace the first correlation ID and resets the correlation ID timer. As a result, if the UE is unavailable for a long time, the re-delivery of the short message to the UE without the MSISDN still can be completed since the correlation ID is renewed until the validity period expires.

Please note that, when replacing the first correlation ID with the second correlation ID, the HSS transmits the second correlation ID to the SMSC for replacing the first correlation ID stored in the SMSC. The second correlation ID may be transmits via a new message, and is not limited herein. Moreover, the second correlation ID may be transmitted to the IP-SM-GW if authentications and confirmation mechanisms are needed to be performed in the IP-SM-GW. Besides, the period of the correlation ID timer should be adequately set according to different applications. For example, a short message may contain a validity period to indicate the validity lifetime of the short message. The IP-SM-GW shall provide the validity period in the request of correlation ID if the short message contains a validity period. If a validity period is forwarded to the HSS by the IP-SM-GW when querying the correlation ID, the period of the correlation ID timer should be set smaller than or equaled to the validity period from the IP-SM-GW. The HSS stores the validity period to make sure the correlation ID timer will not exceed the validity period.

When the timer of the first correlation ID expires, the HSS may generate a new timer and a second correlation ID according to the validity period. Regeneration of second correlation ID is decided by HSS if validity period is not expired yet. If there is validity period provided by IP-SM-GW, the HSS shall generate a second correlation ID timer such that sum of value of the correlation ID timer is smaller than or equaled to the validity period. If the sum of value of the correlation ID timers is equal to the validity period, the HSS shall not generate a new correlation ID and timer if the latest correlation ID timer expires.

According to different applications and design concepts, the timing of resetting the timer and replacing the first correlation ID with the second correlation ID can be appropriately altered. For example, the SMSC may resubmit the short message when the transmission of the short message fails, repeatedly. When the HSS receives the request for the resubmission of the short message and determines the UE is still unavailable and the correlation ID timer of the first correlation ID expires, the HSS generates the second correlation ID to replace the first correlation ID and resets the correlation ID timer. The HSS also responses the request with the second correlation ID to the SMSC for replacing the first correlation ID stored in the SMSC. The re-delivery of the short message to the UE without the MSISDN can be accurately completed.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present disclosure provides a method for handling a short message re-delivery without the MSISDN in a wireless communication system. Via generating and storing the correlation ID corresponding to the short message properly when the transmission of the short message fails, the problem caused by the UE without MSISDN therefore can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a short message re-delivery for a network entity of a wireless communication system, the method comprising:
   receiving a request corresponding to a transmission failure of a short message transmitted to a communication device without a Mobile Subscriber Integrated Services Digital Network Number (MSISDN);
   generating a first correlation identification (ID) according to the request;-and storing the first correlation ID with a short message service center (SMSC) address corresponding to the short message;
   generating and starting a first correlation ID timer for the first correlation ID; storing the first correlation ID timer with the first correlation ID;
   determining whether the first correlation ID timer expires:
   generating a second correlation ID if the first correlation ID timer expires and the value of the first correlation ID timer is smaller than a validity period provided by the request;
   replacing the first correlation ID with the second correlation ID; and
   notifying the SMSC to replace the first correlation ID with the second correlation ID;
   transmitting an alert message according to the first correlation ID or the second correlation ID and the SMSC address for re-delivering the short message.

2. The method of claim 1, wherein the step of generating a second correlation ID if the first correlation ID timer expires and the value of the first correlation ID timer is smaller than the validity period comprises:
   generating the second correlation ID and starting a generated second correlation ID timer; or
   discarding the first correlation ID.

3. The method of claim 2, wherein the second correlation ID timer is set smaller or equal to the validity period of the request if the request includes the validity period.

4. The method of claim 1, wherein a value of the first correlation ID timer is set smaller than or equal to a validity period of the request if the request includes the validity period.

5. A communication device for a wireless communication system, comprising: a processing means; and a storage unit, coupled to the processing means, for storing a program code, wherein the program code instructs the processing means to execute the following step:
receiving a request corresponding to a transmission failure of a short message transmitted to a communication device without a Mobile Subscriber Integrated Services Digital Network Number (MSISDN);
generating a first correlation identification (ID) according to the request;
storing the first correlation ID with a short message service center (SMSC) address corresponding to the short message;
generating and starting a first correlation ID timer for the first correlation ID;
storing the first correlation ID timer with the first correlation ID;
determining whether the first correlation ID timer expires;
generating a second correlation ID if the first correlation ID timer expires and the value of the first correlation ID timer is smaller than a validity period provided by the request;
replacing the first correlation ID with the second correlation ID; and
notifying the SMSC to replace the first correlation ID with the second correlation ID;
transmitting an alert message according to the first correlation ID or the second correlation ID and the SMSC address for re-delivering the short message.

6. The communication device of claim 5, wherein the step of generating a second correlation ID if the first correlation ID timer expires and the value of the first correlation ID timer is smaller than the validity period comprises:
generating the second correlation ID and starting a generated second correlation ID timer; or
discarding the first correlation ID.

7. The communication device of claim 6, wherein the second correlation ID timer is set smaller or equal to the validity period of the request if the request includes the validity period.

8. The communication device of claim 5, wherein a value of the first correlation ID timer is set smaller than or equal to a validity period of the request if the request includes the validity period.

* * * * *